(12) United States Patent
McMurtry et al.

(10) Patent No.: US 9,377,284 B2
(45) Date of Patent: Jun. 28, 2016

(54) METROLOGY APPARATUS

(75) Inventors: David Roberts McMurtry, Dursley (GB); Stephen Paul Hunter, Bristol (GB); Hugo George Derrick, Stroud (GB)

(73) Assignee: RENISHAW PLC, Wotton-Under-Edge (GB)

( * ) Notice: Subject to any disclaimer, the term of this patent is extended or adjusted under 35 U.S.C. 154(b) by 411 days.

(21) Appl. No.: 13/638,429

(22) PCT Filed: Apr. 28, 2011

(86) PCT No.: PCT/GB2011/000652
§ 371 (c)(1),
(2), (4) Date: Sep. 28, 2012

(87) PCT Pub. No.: WO2011/135298
PCT Pub. Date: Nov. 3, 2011

(65) Prior Publication Data
US 2013/0019488 A1    Jan. 24, 2013

Related U.S. Application Data

(60) Provisional application No. 61/368,801, filed on Jul. 29, 2010.

(30) Foreign Application Priority Data

Apr. 30, 2010    (GB) .................................. 1007266.8
Jul. 29, 2010    (GB) .................................. 1012773.6

(51) Int. Cl.
*G01B 5/012*    (2006.01)
*G01B 7/012*    (2006.01)

(52) U.S. Cl.
CPC ................ *G01B 5/012* (2013.01); *G01B 7/012* (2013.01)

(58) Field of Classification Search
CPC ......... G91B 7/102; G01B 7/001; G01B 7/012
USPC ................ 310/112, 114, 156.32, 266; 33/503
See application file for complete search history.

(56) References Cited

U.S. PATENT DOCUMENTS 1,566,693 A  * 12/1925  Pletscher ...................... 310/152
3,727,119 A     4/1973  Stanley et al.
(Continued)

FOREIGN PATENT DOCUMENTS

| CN | 1605145 A | 4/2005 |
| CN | 101321598 A | 12/2008 |

(Continued)

OTHER PUBLICATIONS

British Search Report issued in Application No. 1012773.6; Dated Sep. 17, 2010.

(Continued)

*Primary Examiner* — Thomas Truong
(74) *Attorney, Agent, or Firm* — Oliff PLC (57) ABSTRACT

A metrology apparatus including a body and a first member rotatable relative to the body about a first axis of rotation, said first axis being defined by first bearing and a first motor for actuating rotation of the first member relative to the body about the first axis of rotation. A surface sensing device is attachable to the first member such that the surface sensing device can move with the first member, relative to the body. The first motor may include a first magnet and at least one metal coil spaced apart along the first axis and mounted such that the first magnet and the at least one metal coil are moveable relative to one another.

30 Claims, 7 Drawing Sheets

(56) References Cited

U.S. PATENT DOCUMENTS

| | | | |
|---|---|---|---|
| 4,375,047 A | | 2/1983 | Nelson et al. |
| 5,189,806 A | | 3/1993 | McMurtry et al. |
| 5,505,003 A | * | 4/1996 | Evans et al. ............... 33/501.7 |
| 5,982,074 A | * | 11/1999 | Smith et al. ............... 310/254.1 |
| 6,860,637 B2 | * | 3/2005 | Hunter et al. ............... 384/245 |
| 7,411,325 B1 | * | 8/2008 | Gabrys ............... 310/68 R |
| 7,456,538 B2 | * | 11/2008 | Nai et al. ............... 310/114 |
| 2009/0265946 A1 | * | 10/2009 | Jordil et al. ............... 33/503 |

FOREIGN PATENT DOCUMENTS

| | | |
|---|---|---|
| DE | 10 2009 032 389 A1 | 1/2010 |
| EP | 1 990 112 A1 | 11/2008 |
| JP | 2004-506161 A | 2/2004 |
| JP | 2007-223016 A | 9/2007 |
| WO | WO 95/18484 A1 | 7/1995 |
| WO | WO 01/57473 A1 | 8/2001 |
| WO | 02/12833 A1 | 2/2002 |
| WO | WO 03/052287 A2 | 6/2003 |
| WO | WO 2006/079794 A1 | 8/2006 |
| WO | WO 2007/093789 A1 | 8/2007 |
| WO | WO 2008/024962 A2 | 2/2008 |

OTHER PUBLICATIONS

Written Opinion of the International Searching Authority issued in Application No. PCT/GB2011/000652; Dated Sep. 29, 2011.
International Search Report issued in Application No. PCT/GB2011/000652; Dated Sep. 29, 2011.
Office Action issued in Chinese Patent Application No. 201180020880.3 dated Jul. 2, 2014 (with translation).
Office Action issued in European Patent Application No. 11 724 267.8 dated Jun. 11, 2014.
Feb. 3, 2015 Office Action issued in Japanese Application No. 2013-506733.
Apr. 7, 2015 Office Action issued in European Application No. 11724276.8.
May 4, 2015 Office Action issued in Chinese Application No. 201180020880.3.
Sep. 11, 2015 Office Action issued in Chinese Application No. 201180020880.3

* cited by examiner

METROLOGY APPARATUS

The present invention relates to metrology apparatus. In particular the invention relates to a metrology apparatus comprising a motor.

Metrology apparatus may be a position determining apparatus, such as a coordinate measuring machine, a machine tool, or any probe actuator, or may be mounted to such a position determining apparatus. A metrology apparatus may comprise an articulating joint.

A position determining apparatus (see for example U.S. Pat. No. 3,727,119 which describes a CMM) may be used for measuring a workpiece, and typically comprises an arm moveable in three directions x,y,z relative to a table on which the workpiece is supported. Movement of the arm in each of the directions x,y,z is measured by transducers on the machine, and a probe assembly provided on the arm produces a signal indicating the relationship between the workpiece surface to be measured, and the arm. The position of the surface of the workpiece may thus be determined. In an alternative machine, for example some types of machine tool, the table moves in x and y and the arm moves in z.

Metrology apparatus may include probe apparatus. Probe apparatus may be, for example, a probe actuator or probe head, a probe itself, or a probe assembly comprising a probe actuator or probe head and a probe. Indexing probe actuators or heads and continuous probe actuators or heads are known and are described in WO2006/079794 and WO2001/57473 respectively.

Metrology apparatus comprising at least one rotary axis is known. A first member of such a metrology apparatus may be moveable relative to a second member of the metrology apparatus about the at least one rotary axis. In order to achieve precision and accuracy in measurements obtained by the metrology apparatus the position of the rotary axis should be fixed and known.

In practice, forces acting on or within the metrology apparatus can cause movement of the axis away from its original position; this movement can be known as, for example, run-out and swash. Such movement of the axis causes inaccuracies in measurements obtained by the metrology apparatus, as the metrology apparatus does not know the exact position of the axis, and thus of a measurement probe attached to the axis, at all times.

A first aspect of the present invention describes a motor. The motor may be a frameless motor.

A second aspect of the present invention provides a metrology apparatus comprising:
a body and a first member rotatable relative to the body about a first axis of rotation, said first axis being defined by first bearings;
a first motor for actuating rotation of the first member relative to the body about the first axis of rotation, the first motor comprising a frameless motor;
wherein a surface sensing device is attachable to the first member such that the surface sensing device can move with the first member, relative to the body; and
wherein the first motor is arranged such that when it actuates rotation of the first member relative to the body, substantially no radial forces act on the first bearings such that the location of the first axis remains substantially fixed.

By substantially eliminating radial forces on the bearing the position of the first axis of rotation can be more accurately known. Due to the lack of radial pull on the bearing problems of run-out and swash which are commonly encountered are reduced, or even avoided. This can allow the metrology apparatus to accurately determine the position of an object without the need for extremely stiff bearings or extensive error mapping.

Preferably the first motor is arranged such that when it actuates rotation of the first member relative to the body, substantially no axial forces act on the first bearings. The lack of axial forces may enable a less stiff bearing to be used.

A frameless motor may be a motor without its own set of bearings. A frameless motor may rotate using the bearings of the axis to which it is fitted.

The first motor may be an axial arrangement motor. The motor may be an ironless-core motor.

An ironless-core motor may be a motor having a rotor and a stator, wherein at least one of the rotor and the stator is substantially free of iron. In being substantially free from iron the rotor or stator may thus be non-magnetic, meaning that it may not be attracted to a magnet. Where a motor comprises a magnet portion and a coil portion, the coil portion may be substantially free from iron, or non-magnetic. An ironless core motor may thus comprise a coil that is substantially free from magnetic material.

A third aspect of the present invention describes a metrology apparatus having an ironless-core motor, in particular a frameless ironless-core motor. The ironless-core motor may provide movement of components of the metrology apparatus. The metrology apparatus may comprise a first rotary axis. The ironless-core motor may actuate rotation about said first rotary axis. Said first rotary axis may be a continuous rotary axis.

In use, for example with the metrology apparatus mounted on a coordinate positioning apparatus, the ironless-core motor may provide movement of a device supported by the metrology apparatus relative to the coordinate positioning apparatus. Said movement may be, in particular, rotational movement about one or more axes. Where the metrology apparatus is a coordinate positioning apparatus, the ironless-core motor may provide movement of a device supported by the metrology apparatus relative to a fixed surface.

A fourth aspect of the present invention provides a metrology apparatus comprising:
a body and a first member rotatable relative to the body about a first axis of rotation, said first axis being defined by first bearings;
a first motor for actuating rotation of the first member relative to the body about the first axis of rotation;
wherein a surface sensing device is attachable to the first member such that the surface sensing device can move with the first member, relative to the body; and
wherein the first motor comprises a frameless ironless core motor.

The metrology apparatus may comprise an attachment means for attaching a body to the moveable arm of a machine.

A fifth aspect of the present invention provides a metrology apparatus comprising:
an attachment means for attaching a body to the moveable arm of a machine; and
a body having a first member rotatable relative to the attachment means about a first axis of rotation, wherein said rotation is actuated by a first motor, the body being attachable to a surface sensing device such that the surface sensing device can move with the body, relative to the attachment means;
wherein, the first motor comprises a frameless ironless core motor.

The body may be a support.

A sixth aspect of the present invention provides a metrology apparatus having a frameless axial arrangement motor.

A seventh aspect of the present invention provides a metrology apparatus comprising:

a body and a first member rotatable relative to the body about a first axis of rotation, said first axis being defined by first bearings;

a first motor for actuating rotation of the first member relative to the body about the first axis of rotation;

wherein a surface sensing device is attachable to the first member such that the surface sensing device can move with the first member, relative to the body; and wherein, the first motor comprises a frameless axial motor.

An eighth aspect of the present invention provides a metrology apparatus comprising:

an attachment means for attaching a body to the moveable arm of a machine; and a body having a first member rotatable relative to the attachment means about a first axis of rotation, wherein said rotation is actuated by a first motor, the body being attachable to a surface sensing device such that the surface sensing device can move with the body, relative to the attachment means;

wherein, the first motor comprises a frameless axial arrangement motor.

The body may be a support.

The first axis of rotation may be a continuous rotary metrology axis. The metrology apparatus may thus be positionable at extremely close points about the first axis. The points may be infinitely close compared to, for example, an indexing rotary axis where the points at which the axis may locate are discrete points separated apart from one another. The position of the first motor in the metrology apparatus may be servoed; thus the metrology apparatus may be servoing metrology apparatus. The position of the motor in the metrology apparatus may be controlled by a brake.

The metrology apparatus may comprise a probe apparatus, such as a probe actuator or probe head, a probe itself; or a probe assembly comprising a probe actuator or head and a probe. The probe apparatus may comprise a continuous probe actuator or head. The probe apparatus may comprise an indexing probe actuator or head. The probe actuator or head may be a servoing probe actuator or head, where the position of the motor in the probe actuator or head is controlled by a servo. The position of the motor in the probe actuator or head may be controlled by a brake.

The metrology apparatus may further comprise a second member rotatable relative to the first member about a second axis of rotation. Said rotation may be actuated by a second motor. The second axis of rotation may be transverse to the first axis of rotation. The second axis of rotation may be offset from the first axis of rotation.

The second motor may comprise a frameless ironless core motor. The second motor may comprise a frameless axial motor. Alternatively, the second motor may be a known motor such as, for example a housed or frameless iron core motor, or a housed ironless core motor.

The metrology apparatus may comprise at least one further member, rotatable relative to at least one of the first and second members about a further axis of rotation. Said rotation may be actuated by at least one further motor. The further axis of rotation may be transverse to or offset from at least one of the first and second axes of rotation. The at least one further motor may comprise a frameless ironless core motor. Alternatively, the at least one further motor may be a known motor, such as, for example a housed or frameless iron core motor, or a housed ironless core motor.

A surface sensing device may be attachable to the first member for rotation therewith. This attachment may be direct or indirect. Where attachment is indirect, the surface sensing device may be attached to the first member via, for example, the second or further member. A surface sensing device may be attachable to the second member for rotation therewith. A surface sensing device may be attachable to the at least one further member for rotation therewith.

The surface sensing device may be a probe such as, for example, a measurement probe, a touch trigger probe, a video probe, a surface finish probe, or a combination of different types of probes. A measurement probe may also be known as a scanning probe.

At least one of the motors may be a direct drive motor. At least one of the motors may be an indirect drive motor.

The first motor may be an axial motor or a radial motor. Preferably the first motor is an axial motor. An axial motor comprises a magnet and coil arranged spaced apart along the axis of the motor, whereas a radial motor comprises a magnet and coil arranged spaced apart radially about the axis of rotation of the motor.

The first motor may provide partial rotation about the first axis. In other words the motor may be able to actuate rotation of the first member relative to the body of the metrology apparatus through less than 360 degrees about the first axis. Preferably the first motor provides movement through a full rotation about the first axis. In other words the motor may be able to actuate rotation of the first member relative to the body of the metrology apparatus through 360 degrees about the first axis. The first motor may provide movement through more than one rotation about the first axis. In other words the motor may be able to actuate rotation of the first member relative to the body of the metrology apparatus through greater than 360 degrees about the first axis. The first motor may provide movement about an unlimited number of full rotations about the first axis.

The first motor may be a brushless motor. Alternatively, the first motor may be a brushed motor.

The first motor may comprise a first magnet. The first motor may further comprise at least one metal coil. The first magnet and at least one metal coil may be mounted such that they are moveable relative to one another. Passing a current through the at least one metal coil may cause relative rotation of the at least one metal coil and the first magnet. One of the magnet and at least one metal coil may be attachable to the first member. Such attachment may be direct or via an intermediate member. Rotation of the one of the magnet and at least one metal coil that is attachable to the first member may in use cause rotation of the first member.

The first motor may further comprise a magnetic material. It will be understood by the skilled person that by magnetic material it is meant a material that is attracted to a magnet. The first magnet and the magnetic material may be fixed relative to one another to form a magnet assembly. The first magnet and the magnetic material may be spaced apart from one another; such spacing may be carried out by a spacer. The spacer may be fixed relative to the first magnet and magnetic material and may form part of the magnet assembly. The at least one metal coil may be provided between the spaced apart first magnet and the magnetic material of the magnet assembly. The magnet assembly and the at least one metal coil may be relatively moveable.

The first motor may comprise a plurality of magnets, for example a first magnet and a second magnet. The first magnet and the second magnet may be fixed relative to one another to form a magnet assembly. The first magnet and the second magnet may be spaced apart from one another; such spacing may be carried out by a spacer. The spacer may be fixed relative to the first magnet and second magnet and may form part of the magnet assembly. The at least one metal coil may be provided between the spaced apart first magnet and the second magnet of the magnet assembly. The first and second magnets may be shaped and sized to complement each other.

In use, the at least one metal coil may be fixed relative to a housing of the metrology apparatus and the magnet assembly may be caused to rotate relative to the at least one metal coil by passing a current through the at least one metal coil. Alternatively, in use, the magnet assembly may be fixed to a housing of the metrology apparatus and the at least one metal coil may be caused to rotate relative to the magnet assembly by passing a current through the at least one metal coil. In other words, one of the magnet assembly and the at least one metal coil may form the stator of the motor and the other of the magnet assembly and the at least one metal coil may form the rotor of the motor.

The first magnet and the magnetic material may be moveable relative to one another. The at least one metal coil may be fixed to the magnetic material. As such the magnet may be moveable relative to the magnetic material and the at least one metal coil, or vice versa. The first magnet and the magnetic material may be spaced apart from one another; such spacing may be performed by a bearing of some kind, or a combination of a spacer and a bearing, for example. The spacer may be fixed relative to at least one of the first magnet and magnetic material, and moveable relative to the other of the first magnet and magnetic material. The bearing may be provided between the spacer and at least one of the first magnet and magnetic material.

The metrology apparatus may comprise a bearing for enabling rotation of the first member relative to the body about the first axis of rotation. The bearing used for rotation of the motor may be the bearing for enabling rotation of the first member relative to the body, i.e. the first axis' bearing.

In use, the metallic material and at least one metal coil may be fixed relative to a housing of the metrology apparatus and the first magnet may be caused to rotate relative to the at least one metal coil by passing a current through the at least one metal coil. Alternatively, in use, the first magnet may be fixed to a housing of the metrology apparatus and the at least one metal coil and magnetic material may be caused to rotate relative to the first magnet by passing a current through the at least one metal coil. In other words, one of the first magnet and the at least one metal coil may form the stator of the motor and the other of the first magnet and the at least one metal coil may form the rotor of the motor.

The magnetic material may comprise a plate of magnetic material shaped and sized to complement the first magnet.

The first magnet of the first motor may comprise a plurality of magnets. Said plurality of magnets may be arranged in a ring. The second magnet may comprise a plurality of magnets. Again, said plurality of magnets may be arranged in a ring. The ring of magnets may be arranged such that North and South poles are positioned alternately around the ring. Said ring may be, for example, an incomplete ring, for example an arc of a motor, a segmented ring, or a complete ring. Any segments of the ring may be immediately adjacent or may be spaced apart.

At least one of the first and second magnets may be provided with a magnetic material, or backplate, on the side of the magnet distal the at least one metal coil. The magnetic material, or backplate, may be shaped and sized to complement the magnet on which it is provided.

The at least one metal coil may comprise a plurality of coils. The plurality of coils may be provided in a ring. Said ring may be, for example, an incomplete ring, for example an arc of a motor, a segmented ring, or a complete ring. Any segments of the ring may be immediately adjacent or may be spaced apart. At least one of the metal coils may be shaped and sized to complement the shape and size of at least one of the plurality of magnets forming at least one of the first and second magnets. A plurality of the metal coils may be shaped and sized to complement the shape and size of a plurality of the plurality of magnets forming at least one of the first and second magnets. Preferably all of the coils are shaped and sized to complement the shape and size of each of the plurality of magnets forming at least one of the first and second magnets. The relative number of coils and magnets and size of said coils and magnets may be chosen to optimise the efficiency of the motor and minimise the torque ripple of the motor. For example, the magnet or ring of magnets may be smaller than the at least one metal coil or ring of metal coils, such that the centrelines of the rings are coincident but the magnets do not extend as far radially inwards or outwards from their centreline as the coils do. Alternatively, for example, the magnets and coils may be equally sized.

A ninth aspect of the invention provides a metrology apparatus comprising a body and first member moveable with respect to the body under the control of a motor, the first member attachable to a surface sensing device, the motor comprising a rotor connected with the first member and a stator connected with the body, one of the rotor and the stator comprising a magnetic assembly for establishing a magnetic field that acts on the other of the stator or rotor predominantly in a direction substantially parallel with an axis of rotation of the rotor, and at least one coil on the other one of the stator and rotor, which, when carrying an electric current, generates a magnetic field that cooperates with the magnetic field established by the magnetic assembly to cause rotation of the rotor, the rotor and the stator spaced apart in an axial direction.

The magnetic assembly may comprise at least one pair of magnets, the magnets of the pair spaced apart in the axial direction, the at least one coil mounted for relative movement between the magnets.

The magnet assembly may comprise a plurality of pairs of magnets, magnets of each pair spaced apart and aligned in the axial direction, the north pole of one magnet of the pair facing the south pole of the other magnet of the pair.

The magnetic assembly may comprise a plurality of coils, each coil, when carrying an electric current, generates a magnetic field through the coil in the axial direction substantially parallel with an axis of rotation of the rotor.

A tenth aspect of the invention provides a metrology apparatus comprising a body and a first member movable with respect to the body under the control of a pancake motor, the first member attachable to a surface sensing device.

An eleventh aspect of the invention provides a metrology apparatus comprising:
  a body and a first member rotatable relative to the body about a first axis of rotation, said first axis being defined by first bearings;
  a first motor for actuating rotation of the first member relative to the body about the first axis of rotation, the first motor comprising at least one magnet for generating a magnetic field that acts on at least one coil predominately in an axial direction;
  wherein a surface sensing device is attachable to the first member such that the surface sensing device can move with the first member, relative to the body.

Descriptions relating to the first motor may be applied to at least one of any second and further motors provided.

Preferred embodiments of the invention will now be described by way of example and with reference to the accompanying drawings, wherein:

FIG. 5b shows an exploded view of the axial ironless-core motor shown in FIG. 5a;

Figure 1:
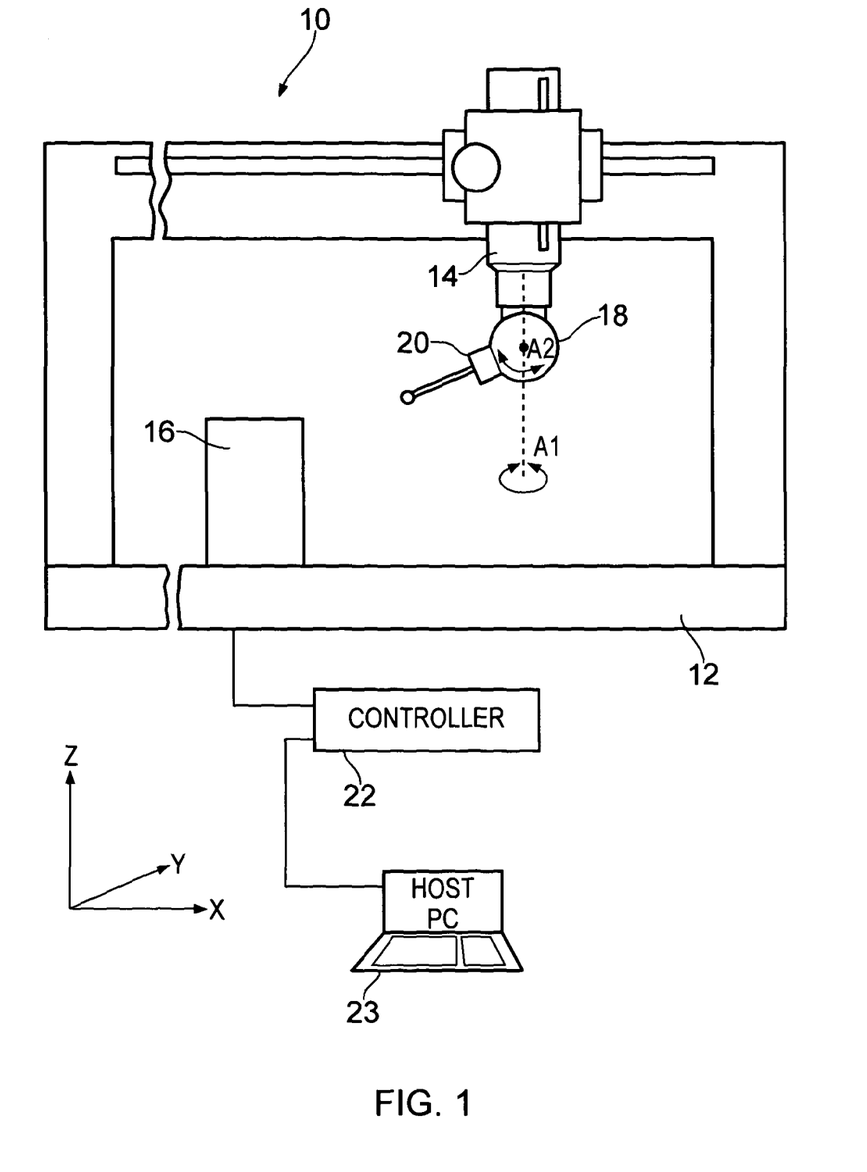
FIG. 1 shows a coordinate measuring machine (CMM) having a probe apparatus mounted thereon.

FIG. 1 illustrates a coordinate measuring machine (CMM) 10 which comprises a table 12 onto which a part 16 can be mounted and a quill 14 which is movable relative to the table 12 in X,Y and Z. An articulating probe head 18 is mounted on the quill 14 and provides rotation about at least two axes A1,A2. A probe 20 is mounted onto the articulating probe head 18. The probe 20 can thus be moved in X,Y and Z by the CMM 10 and can be rotated about the A1 and A2 axes by the articulating probe head 18.

Motors are provided in the CMM 10 and articulating probe head 18 to drive the probe 20 to the desired position/orientation and these are controlled by a controller/computer 22/23 which sends drive signals to the CMM 10 and articulating probe head 18.

The positions of the CMM 10 and articulating probe head 18 are determined by transducers (not shown) and the positions are fed back to the controller/computer 22/23.

Figure 2:
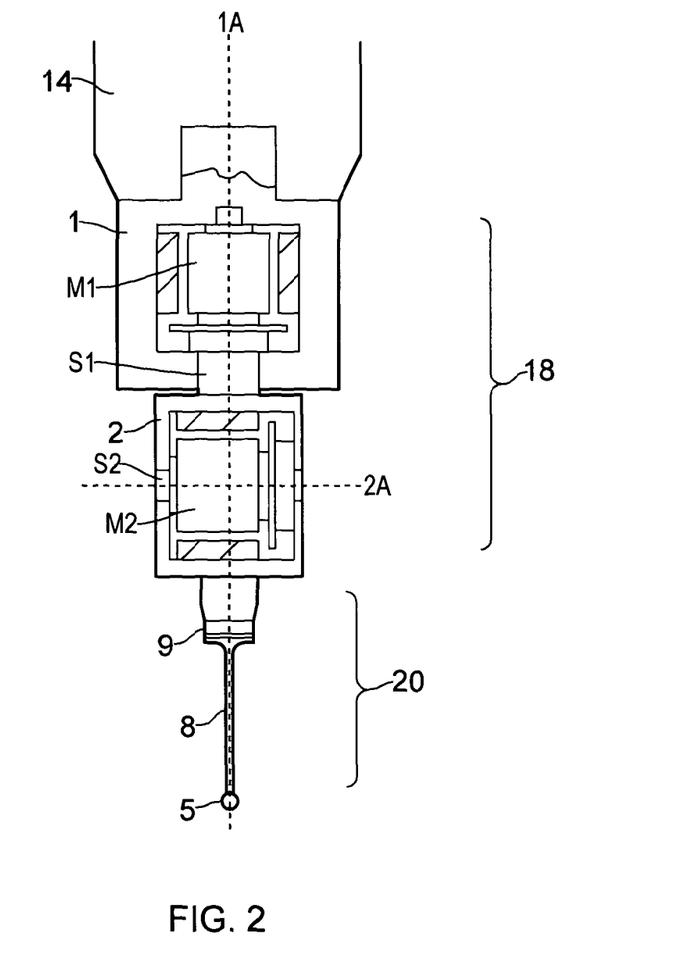
FIG. 2 shows a cross-section through the articulating probe head shown in FIG. 1.

FIG. 2 shows a cross-section through the articulating probe head 18 shown in FIG. 1. The articulating probe head 18 comprises first and second housing members 1 and 2 respectively. The first housing member 1 is adapted for attachment to a position determining apparatus, such as the quill 14 of the CMM shown in FIG. 1, and houses a motor M1 for effecting angular displacement of a first shaft S1 about a first axis A1. Attached to the first shaft S1 is the second housing member 2, which houses a motor M2 for effecting angular displacement of a second shaft S2 about a second axis A2. Attached to the second shaft S2 for rotation therewith is a surface-sensing device 20 such as a surface-sensing probe. Each of the shafts S1,S2 may be positioned at infinitely close, or extremely close points about the respective rotational axes A1, A2, thus the articulating probe head is known as a continuous probe head. This is in contrast to an indexing probe head where a discrete number of kinematically defined orientations of the surface sensing probe relative to the CMM on which the probe head is mounted are available.

The surface sensing probe 20 comprises a probe body 9, a stylus 8, and a stylus tip 5 for contacting a workpiece. The surface-sensing probe shown is a contact sensing probe. Such contact sensing probes include touch trigger probes and scanning probes. In a typical scanning operation the surface-sensing probe is driven over the surface of a workpiece to enable measurements to be made of points on the workpiece surface.

Other types of probes may be used with the articulating probe head 18, including non-contact probes such as optical, capacitance and inductance sensing probes.

Power is supplied to the rotary drive mechanisms M1, M2 through electrical connections from a controller (22 shown in FIG. 1) which is programmed to control the surface sensing device 20 to move over the surface of a workpiece (16 shown in FIG. 1) in a desired series of moves. Transducers within the probe head 18 send signals indicative of the angular positions of the drive mechanisms about their respective axes back to servo control loops in the controller. These signals together with signals from the measuring devices of the machine on which the probe head is mounted, enable the relative positions of the surface sensing device 20 and a workpiece surface to be accurately controlled. The articulating probe head 08 described with reference to FIG. 2 is thus a continuous servoing probe head.

Figure 3:
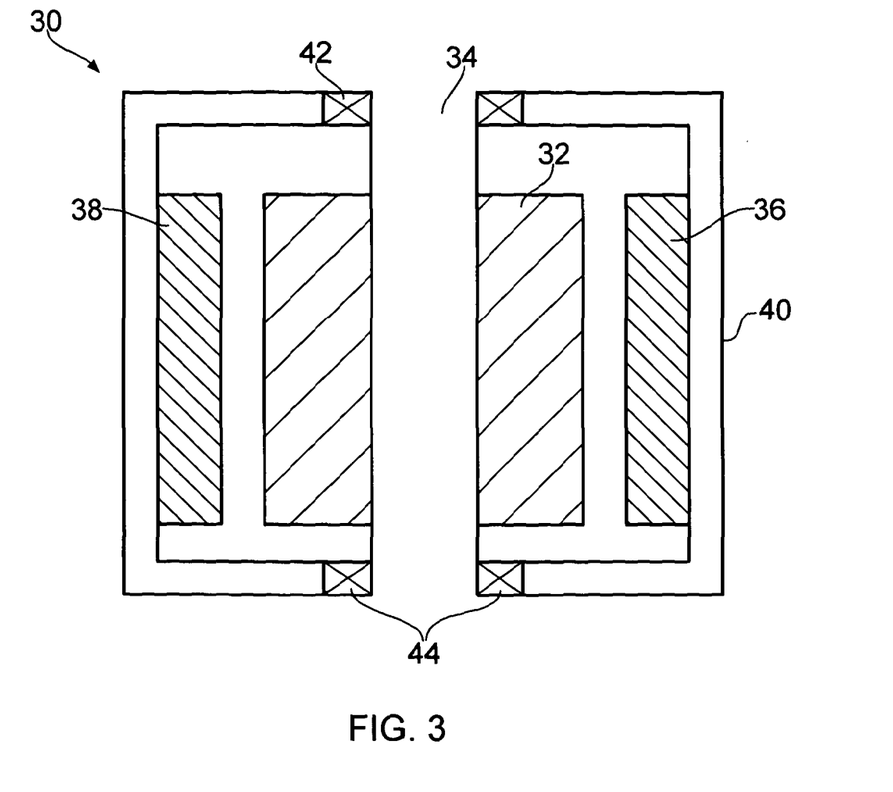
FIG. 3 shows a cross section through a motor having an iron core as used in the probe head shown in FIG. 2.

FIG. 3 shows a cross section through a motor 30 having an iron core as used in the probe head shown in FIG. 2. The motor has a rotor formed from an iron core 32 which has a copper wire (not shown) coiled tightly around it. The rotor is attached to the spindle 34 of the motor. Attached to the housing 40 of the motor is a ring of magnets 36 and 38 forming a frame around the iron core 32. The wire is connected at each of its ends to a supply of current. When current is supplied to the wire the iron core becomes magnetic and repels/attracts the magnets 36,38 fixed to the housing 40 of the motor 30, causing the rotor, and in turn the spindle 34 to spin. In a metrology application where it is extremely important that the accurate position of the spindle, and thus the probe supported on and moveable with the spindle, is known, this motor requires stiff bearings 42,44. The stiff bearings aim to prevent the rotor from being pulled towards the magnets attached to the housing and thus pulling the spindle away from its axis of rotation. Designing bearings to be accurate in terms of run-out and swash, i.e. preventing the axis of the bearing from wandering laterally, or tilting, can be extremely difficult, and therefore expensive. Furthermore, the requirement of fighting against the magnetic attraction between the rotor and the stator of the motor for providing movement of the axis make the task even more difficult. As an alternative to stiff bearings, a map of the differences between the actual positions of the probe tip and the positions the probe tip should be in if the spindle were not being moved by the magnetic forces can be made. This is known as an error map. The errors can be added to the position in which the system thinks the probe tip is in to find the actual position of the probe. However these maps can be time consuming to prepare and at present do not get rid of all errors in the measurements.

Figure 4:
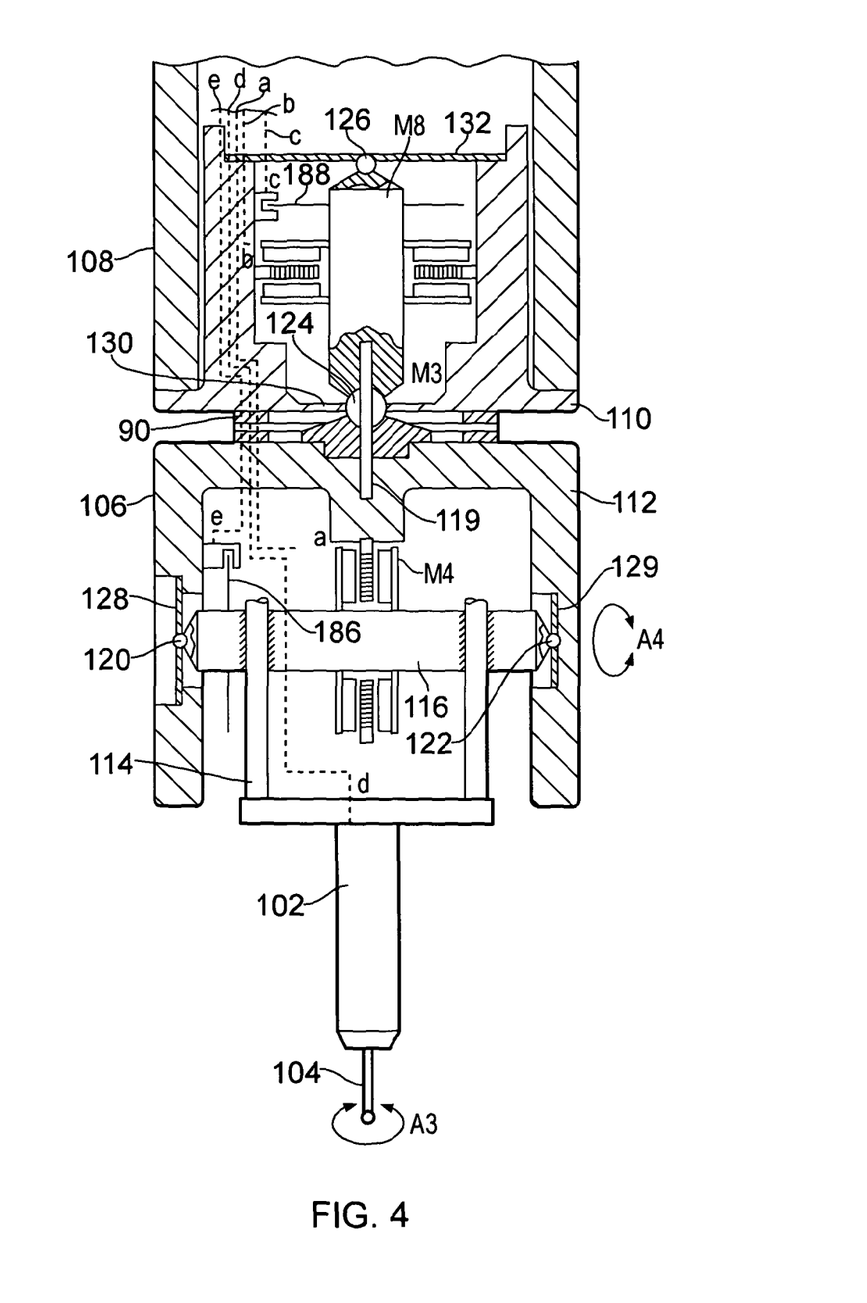
FIG. 4 shows a cross-section through a probe apparatus having a frameless ironless-core motor.

FIG. 4 shows a cross-section through a probe apparatus having a frameless ironless-core motor. In this embodiment, the motor is of the type typically referred to as a pancake motor. A probe 102 is shown having a stylus 104 for contact with an item to be measured. The probe 102 is attached to a probe head 106 which is in turn attached to the quill 108 of a coordinate measuring machine.

Conventionally, in use, the quill 108 of a CMM will be moved in any of the three orthogonal axes until the stylus 104 touches an item. The position of the quill 108 with respect to the three axes can be used, together with positional data from the probe head and the probe itself, to determine dimensions of the item.

In addition to the three axes of movement of the quill 108, a probe head 106, attached to the quill 108 and between the quill 108 and the probe 102, has a wrist configuration which adds two rotational axes A3,A4 of movement to the measurement apparatus, said rotational axes being perpendicular to one another. Motors M3 and M4 provide the torque for the rotation in the two axes. Measurements of a sample may be taken by the probe by moving both the quill 108 and the probe head 106, moving just the quill, or moving just the probe head.

Articulation of the probe head 106 allows more complex movements of the probe 102 than movement of the quill alone. For example movement of the probe head may enable the probe to measure the roundness of a bore along its length by moving the stylus 104 in a helical path around the bore. The position of the stylus 104 can be calculated from the known rotational positions of the stylus 104 and the three CMM axis readings.

Such rotational movement of the probe requires accurate and repeatable movement of the bearings in the probe head. In this embodiment the probe 102 is mounted to a carriage 114 held on a horizontal spindle 116. The spindle 116 has a bearing assembly at each end connected to a lower housing 112 of head 106. The lower housing 112 is connected to a vertical spindle 118 in an upper housing 110 of the head 106 which has two bearing assemblies also.

Horizontal spindle 116 may rotate relative to the lower housing 112. Rotation is achieved by use of two bearing assemblies having parts 120 and 128, and 122 and 129. Male bearing parts in the form of balls 120 and 122 are fixed (for example by means of adhesive) to the ends of the spindle 116. Each ball is accommodated in a female part in the form of supports 128 and 129 each having male part accepting apertures therein such that the spindle's only possible movement is rotation "A4". Similarly lower housing 112 is rotatably mounted via vertical spindle 118. Two bearing assemblies are shown comprising male parts in the form of two balls 124 and 126 accommodated in two female parts in the form of supports 130 and 132 having apertures therein, all providing rotational movement "A3".

Balls 120,122,124 and 126 can be manufactured by known techniques to very high accuracy, i.e. less than 0.16 microns overall roundness tolerance. This exact sphericity provides accurate movement of the probe in rotation. The balls may be of a ceramic, ruby or steel material.

Each spindle 116 and 118 has a fixed support i.e. 129 and 310 respectively and a movable support i.e. 128 and 132. The fixed support is held in fixed relation to its mounting whereas the movable support can move resiliently in the direction of the associated rotational axis.

Power and signal paths a,b,c,d and e are shown. Path 'a' provides power to motor M4 for rotating spindle 116 (and hence probe 102) about axis A4. Path b provides power to motor M3 for rotating spindle 118 (and hence lower housing 112 and probe 102) about axis A3.

The rotational position of spindles 116 and 118 can be determined by rotary encoders 186 and 188 respectively. Paths e and c are provided for the encoder signals.

Paths a,d and e have a rotary coupling 190, the two halves of which may be in sliding contact (e.g. by use of slip rings) or may be of the non-contact type (e.g. a capacitive, inductive, infra-red, optical or R.F. link). The rotary coupling allows continuous rotation of the lower housing 112 relative to the upper housing 110.

Motors M3 and M4 may be frameless ironless core motors as described in more detail with reference to FIG. 5 below.

The figures as shown herein are described in the orientation as shown. It will be understood that the apparatus may be used in any other orientation, such as for example on a horizontal arm of a machine, or other orientation arm.

Figure 5A:
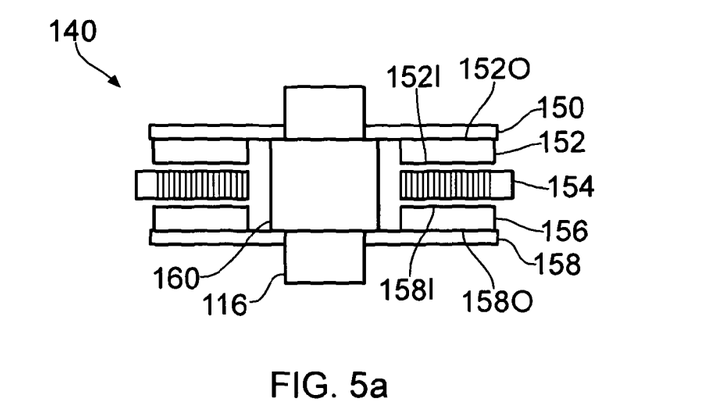
FIG. 5a shows a section through an axial ironless-core motor.

FIG. 5a shows a section through an axial ironless-core motor 140 comprising two backplates, 150,158, two rings of magnets 152,156, a spacer 160 for spacing the rings of magnets apart, and a ring of metal coils 154.

The motor comprises two rings of magnets 152, 156 spaced apart along the spindle 116 of a probe head (see FIG. 4) by a spacer 160. The spacer must be stiff enough to keep the rings of magnets spaced apart; it may be made of a metal or a polymer, for example. The rings of magnets have an inner face 152I,158I facing the centre of the motor, and an outer face 152O,158O facing the outside of the motor. The outside face 152O,158O of the rings of magnets are mounted to steel backplates. In practice any ferrous material would be suitable as a backplate. Together, the two rings of magnets 152,156, the backplates 150,158 and the spacer form a magnet assembly.

Between the rings of magnets 152,156, a ring of copper wire coils are suspended such that the magnets and coil are relatively movable. In this case the ring of coils is held static relative to a body, in this embodiment, upper or lower housing 110, 112, to form the stator, and the magnet assembly is fixed to a first member, in this embodiment spindle 118 or 116, which is rotatable relative to the body to form the rotor. The copper wire coils are secured to a plate which is connectable to the housing of a probe in which the motor may be used. The plate may be made from non magnetic material, such as, for example, plastic, or fibre based material. The copper wire coils are connected at two locations to a source of current. As with a normal electromagnet, the direction in which the current travels determines the direction in which the magnet assembly moves. When current is supplied to the wire coils the coils become magnetic. The current in the coils is servoed in relation to the rotation of the motor to provide torque from the motor.

As the magnet assembly is caused to rotate so too is the spindle 116 to which the spacer of the magnet assembly is fixed, in turn causing movement of the probe relative to the machine on which the probe head is mounted.

The motor of FIG. 5a is brushless.

The skilled person will understand that the motor will work, for example, if the magnets in the ring are spaced apart from each other around the ring, if the ring is not complete, and if the ring is made of one magnet which has been magnetised to have alternating North and South poles.

The motor in FIG. 5a is an axial motor arrangement. However, the skilled person will understand that the motor may be arranged as a radial motor. Such a radial motor may have, for example, a magnetic core, a steel outer casing, and a wire coil positioned between the two.

Use of an ironless core motor in this application has the advantage that there is minimal or no axial or radial pull between the rotor and stator of the motor. Thus the rotor and stator do not require a stiff bearing between them to prevent them being pulled together and stopping the motor rotating. A cheaper, less stiff bearing may be used with an ironless core motor.

By using a frameless motor the bearing of the metrology axis itself may be used, rather than having to couple the bearing of a framed motor to the bearing of the metrology axis.

The efficiency of the motor shown in FIG. 5a and b is comparable to the efficiency of an iron core motor. In particular, the arrangement of magnets and back plates creates a strong magnetic field within which the ring of coils is positioned.

Figure 5B:
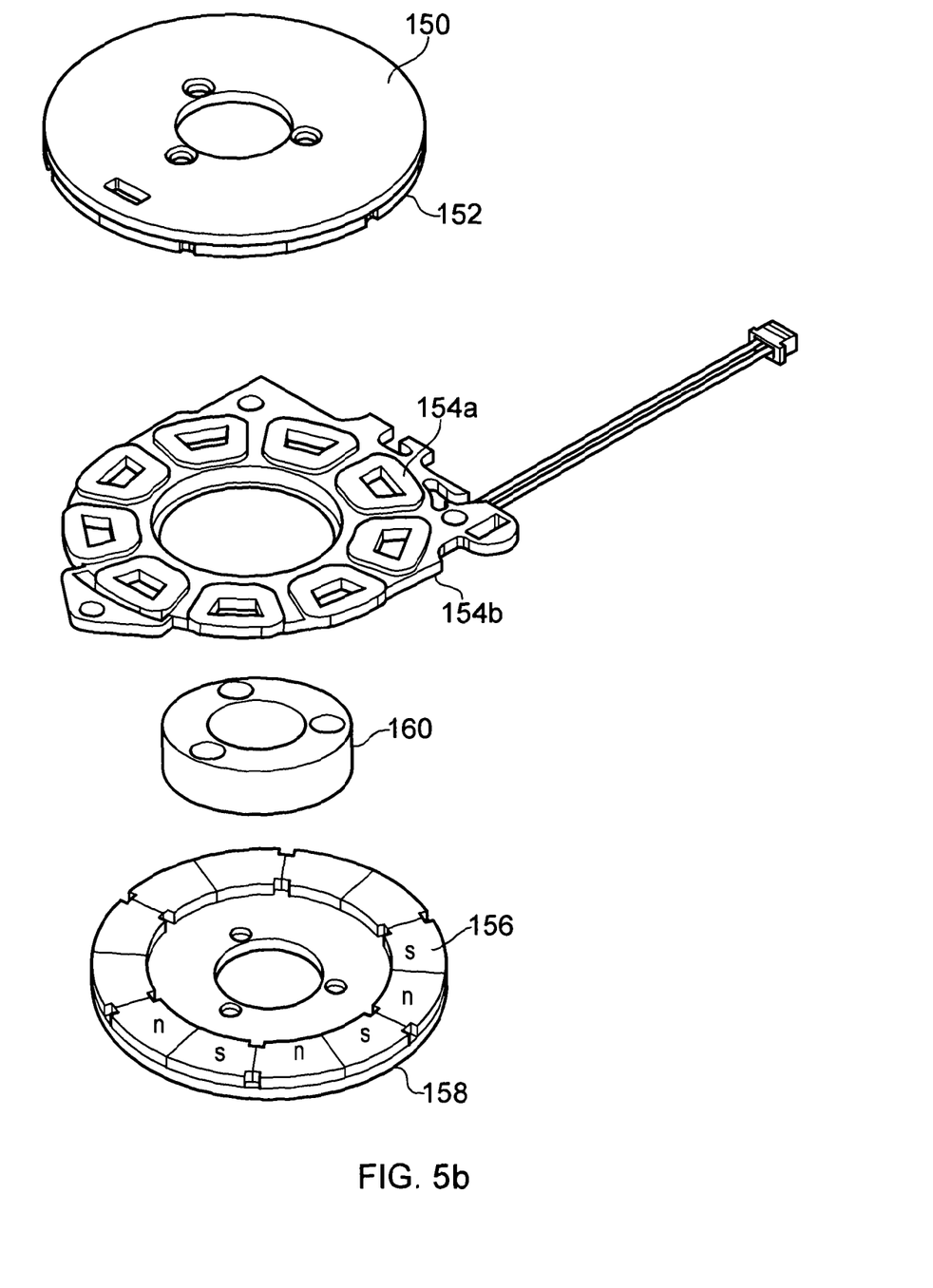
Figure 8:
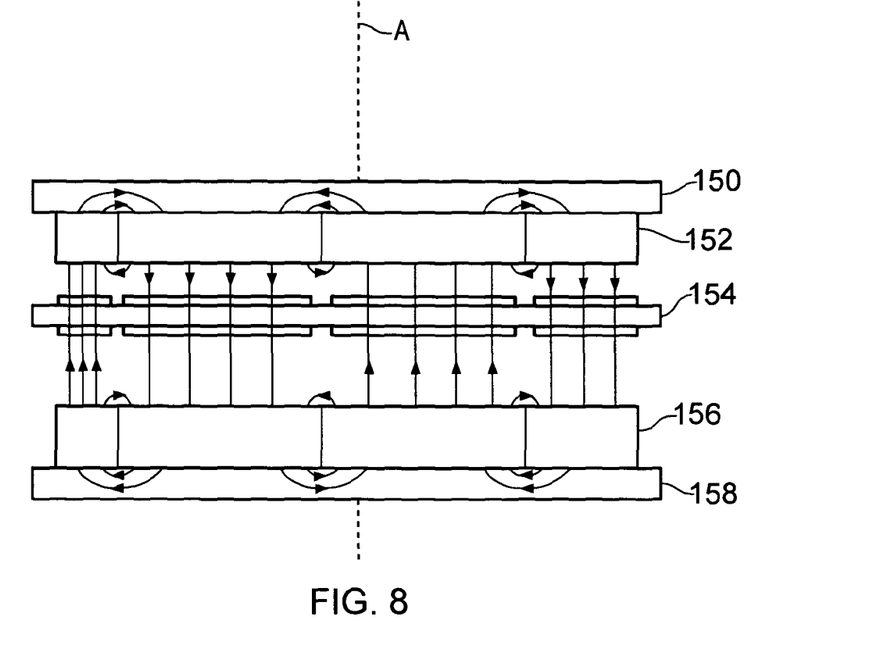
FIG. 8 is a section though the motor showing the typical magnetic field established by the magnet assembly.

FIG. 5b shows an exploded view of the axial ironless-core motor 140 shown in FIG. 5a. The numbering of the parts is consistent with that of FIG. 5a. As can be seen the magnets 152,156 are arranged such that north and south poles of the magnets alternate around each ring. As can be seen clearly from FIG. 8, each pole is aligned in the axial direction with a corresponding opposing pole on the other ring. In this way, the magnetic field predominantly acts on the coils 154 in a direction substantially parallel to the rotational axis A of the rotor (as shown by the flux lines). Of course, in the region wherein opposing poles of the magnets 152 or 156 abut, the magnetic field may act in a direction that is not parallel to the axis of rotation. However, the proportion of the field that acts circumferentially is very small.

The plates 150, 158 are made of magnetisable material and shape the magnetic field to reduce the magnitude of the field extending beyond these plates 150, 158. This reduces the effects of the magnetic field on any parts of the metrology device external to the motor.

In this embodiment, the magnets 152, 156 are shown as discrete magnets attached to the back plate 150, 158. However, it will be understood that the magnets could be formed by a continuous ring of material attached to the back plate 150, 158, the ring of material suitably polarised to provide alternating north and south poles.

Figure 7:
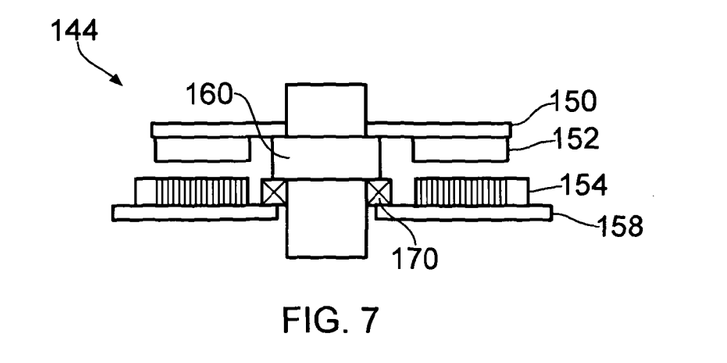
FIG. 7 shows a section through a frameless axial arrangement motor.

In FIG. 7, the spacer 160 is also shown.

Each individual coil 154a can also be seen. The coils are sized and shaped to match the size and shape of the magnets, each coil fitting within a footprint (when viewed in the axial direction) of opposing poles of magnets 152, 156. This improves the efficiency and torque ripple of the motor. The relative number of coils and magnets is also chosen to optimise efficiency and torque ripple of the motor.

Figure 6:
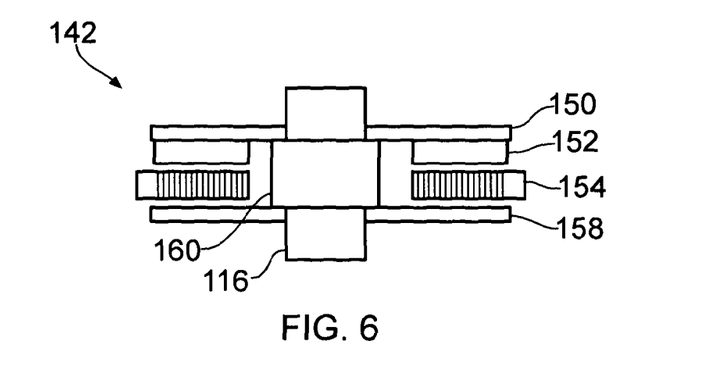
FIG. 6 shows a section through a further axial ironless-core motor.

FIG. 6 shows a section through a further axial ironless-core motor 142. The motor comprises a first and second backplate, 150,158, one ring of magnets 152 a spacer 160 for spacing the ring of magnets and the first backplate 150 from the second back plate 158, and a ring of metal coils 154. In contrast to FIG. 5a there is no second ring of magnets. Instead the two backplates and one ring of magnets form the magnet assembly. As with the motor of FIG. 5a the magnet assembly forms the rotor and the coil assembly forms the stator. It will be clear to the skilled person that the magnet assembly could alternatively form the stator and that the coil assembly could be attached to the shaft of the axis, forming the rotor of the motor.

The two rings of magnets of the motor of FIG. 5a have the advantage of providing a better magnetic field in that radial forces on the rotor produced by the magnetic field are small compared to the motor shown in FIG. 3. Therefore, it is less likely that the axis of the motor will be displaced from its original position.

A further advantage of the motor compared to the motor shown in FIG. 3 is that the motor can generate a large torque for the volume of space that is occupies. In particular, without the need for an outer frame of magnets forming (for example, the stator in FIG. 3) around an inner core of coils (the rotor in FIG. 3), the coils 154 and/or magnets 152,156 can be located close to an outer circumference of the motor to maximise the torque generated for the applied force.

At least one of the motors may be a frameless axial arrangement motor such as the motor shown in FIG. 7.

FIG. 7 shows a section through a frameless axial arrangement motor 144. The motor 144 comprises a first and second backplate, 150,158, one ring of magnets 152 a spacer 160 for spacing the ring of magnets and the first backplate 150 from the second back plate 158, and a ring of metal coils 154. In contrast to the motor of FIG. 6, the ring of metal coils 154 of motor 144 is fixed to the second backplate 158. In the motor of FIG. 7, motor 144, the first backplate 150, the ring of magnets 152 and the spacer 160 are moveable on a bearing 170 relative to the second backplate 158 and ring of coils 154. Thus the first backplate 150, the ring of magnets 152 and the spacer 160 form the rotor of the motor and the second backplate 158 and ring of coils 154 form the stator of the motor. The relative sizes of the rotor and stator geometry should be chosen to maximise efficiency of the motor. The ring of coils may have a radius at least equal to that of the radius of the ring of magnets. Preferably, the ring of coils of the motor should be of greater radius that the ring of magnets.

The bearing 170 is the bearing of the axis of the metrology apparatus to which the motor is fitted. The motor is frameless, therefore it is not provided with its own bearing but uses the bearing for the axis to which it is fitted.

The motor shown in FIG. 7 is an axial arrangement motor, i.e. the rotor and stator are spaced apart along the axis of rotation, rather than spaced radially about the axis of rotation.

In the motor of FIG. 7 there is no iron inside the coils of the ring of coils 154, but the coils are fixed to the second backplate 158 so there may be some degree of attraction between the rotor and stator of the motor 144 and thus some axial pull on the motor. The bearing of the axis of the metrology apparatus to which the motor is fixed should therefore be stiff enough to resist this axial pull. Because of the axial arrangement of the motor only axial pull between the rotor and the stator should exist; there should be no radial pull. In the motor shown in FIG. 7 substantially no radial forces act on the bearings, such that the location of the axis of the metrology apparatus remains substantially fixed as the motor rotates. As the location of the axis of the metrology apparatus remains substantially fixed problems of run-out and swash which are commonly encountered with iron core motors are substantially avoided.

The invention claimed is:

1. A metrology apparatus comprising:
a body and a member mounted to the body by mechanical bearing assemblies such that the member is rotatable relative to the body about an axis of rotation;
a motor for actuating rotation of the member relative to the body about the axis of rotation;
wherein a surface sensing device is attachable to the member such that the surface sensing device rotates with the rotation of the member, relative to the body;
wherein the motor comprises a magnet and at least one metal coil spaced apart along the axis and mounted such that the magnet and the at least one metal coil are moveable relative to one another; and
wherein the motor is arranged such that when it actuates rotation of the member relative to the body, substantially no radial forces from the motor act on the mechanical bearing assemblies such that the location of the axis remains substantially fixed.

2. A metrology apparatus according to claim 1, wherein the motor comprises first and second magnets, the second magnet spaced apart from the first magnet along the axis by a spacer and the at least one metal coil is provided between the first magnet and the second magnet.

3. A metrology apparatus according to claim 2, comprising two rings of magnets spaced apart along the axis by the spacer and, between the rings of magnets, a ring of coils suspended such that the magnets and the coils are relatively movable.

4. A metrology apparatus according to claim 3, wherein each ring of magnets comprises alternating north and south poles.

5. A metrology apparatus according to claim 4, wherein north poles of the magnets of one of the rings face and are axially aligned with south poles of magnets of the other ring.

6. A metrology apparatus according to claim 2, wherein the first and second magnets produce a magnetic field across the coil acting predominantly in a direction parallel with the axis.

7. A metrology apparatus according to claim 2, wherein the first magnet and the second magnet are fixed relative to one another to form a magnet assembly and one of the magnet assembly and the at least one metal coil forms the stator of the motor and the other of the magnet assembly and the at least one metal coil forms the rotor of the motor.

8. A metrology apparatus according to claim 1 wherein the motor further comprises magnetisable material, the magnetisable material spaced apart from the magnet along the axis by a spacer and the at least one metal coil is provided between the magnet and the magnetisable material.

9. A metrology apparatus according to claim 8, wherein the magnetisable material is a plate and the magnet and the plate are fixed relative to one another to form a magnet assembly and one of the magnet assembly and the at least one metal coil forms the stator of the motor and the other of the magnet assembly and the at least one metal coil forms the rotor of the motor.

10. A metrology apparatus according to claim 9, wherein the at least one metal coil is fixed to the magnetisable material such that the magnet is moveable relative to the metal coil and the magnetisable material.

11. A metrology apparatus according to claim 1, wherein one of the magnet and at least one metal coil is attached to the member.

12. A metrology apparatus according to claim 1, wherein the motor is a frameless motor.

13. A metrology apparatus according to claim 1, wherein the motor is an ironless-core motor.

14. A metrology apparatus according to claim 1, wherein the axis of rotation is a continuous rotary metrology axis.

15. A metrology apparatus according to claim 1, wherein a position of the motor is servoed.

16. A metrology apparatus according to claim 1, wherein the motor is a direct drive motor.

17. A metrology apparatus according to claim 1, comprising a probe apparatus.

18. A metrology apparatus according to claim 1, further comprising a second member rotatable about a second axis of rotation, said rotation actuated by a second motor.

19. A metrology apparatus according to claim 18 wherein the second axis of rotation is at least one of transverse to the axis of rotation and offset from the axis of rotation.

20. A metrology apparatus according to claim 18, wherein the second motor comprises an ironless core motor.

21. A metrology apparatus according to claim 1, wherein the surface sensing device attachable to the member is a probe.

22. A metrology apparatus according to claim 1, wherein each one of the bearing assemblies comprises a male bearing part that is accommodated in a female bearing part.

23. A metrology apparatus according to claim 1, wherein the member is a spindle and one of the bearing assemblies is provided as each end of the spindle.

24. A metrology apparatus according to claim 1, wherein each one of the bearing assemblies comprises a ball and a support having an aperture for receiving the ball.

25. A metrology apparatus comprising a body and a member mounted to the body by mechanical bearing assemblies that the member is rotatable moveable with respect to the body under the control of a motor, the member attachable to a surface sensing device such that the surface sensing device rotates with a rotation of the member relative to the body, the motor comprising a rotor connected with the member and a stator connected with the body, one of the rotor and the stator comprising a magnetic assembly for establishing a magnetic field that acts on the other of the stator or rotor predominantly in a direction substantially parallel with an axis of rotation of the rotor, and at least one coil on the other one of the stator and rotor, which, when carrying an electric current, generates a magnetic field that cooperates with the magnetic field established by the magnetic assembly to cause rotation of the rotor, the rotor and the stator spaced apart in an axial direction, wherein the pancake motor is arranged such that when it actuates rotation of the member relative to the body, substantially no radial forces from the pancake motor act on the mechanical bearing assemblies such that the location of the axis remains substantially fixed.

26. A metrology apparatus according to claim 25, wherein the magnetic assembly comprises at least one pair of magnets, the magnets of the pair spaced apart in the axial direction, the at least one coil mounted for relative movement between the magnets.

27. A metrology apparatus according to claim 26, wherein the magnet assembly comprises a plurality of pairs of magnets, magnets of each pair spaced apart and aligned in the axial direction, the north pole of one magnet of the pair facing the south pole of the other magnet of the pair.

28. A metrology apparatus according to claim 27, comprising a plurality of coils, each coil, when carrying an electric current, generates a magnetic field through the coil in the axial direction.

29. A metrology apparatus comprising a body and a member movable mounted to the body by mechanical bearing assemblies such that the member is rotatable with respect to the body under control of a pancake motor, the member attachable to a surface sensing device such that the pancake motor provides direct-drive to the surface sensing device for rotating the surface sensing device relative to the body, an axis about which the surface sensing device rotates being defined by the mechanical bearing assemblies, wherein the pancake motor is arranged such that when it actuates rotation of the member relative to the body, substantially no radial forces from the pancake motor act on the mechanical bearing assemblies such that the location of the axis remains substantially fixed.

30. A metrology apparatus comprising:

a body and a member mounted to the body by mechanical bearing assemblies such that the member is rotatable relative to the body about an axis of rotation;

a motor for actuating rotation of the member relative to the body about the axis of rotation, the motor comprising at least one magnet for generating a magnetic field that acts on at least one coil predominately in an axial direction;

wherein a surface sensing device is attachable to the member such that the surface sensing device rotates with the rotation of the member relative to the wherein the motor is arranged such that when it actuates rotation of the member relative to the body, substantially no radial forces from the motor act on the mechanical bearing assemblies such that the location of the axis remains substantially fixed.

* * * * *